United States Patent [19]

van de Meer et al.

[11] Patent Number: 5,089,562

[45] Date of Patent: Feb. 18, 1992

[54] POLYMER MIXTURE COMPRISING POLYPHENYLENE ETHERS AND POLYOCTENYLENE AND ARTICLES FORMED THEREFROM

[75] Inventors: Roelof van de Meer, Halsteren, Netherlands; Marinus E. J. Dekkers, Schenectady, N.Y.

[73] Assignee: General Electric Co., Selkirk, N.Y.

[21] Appl. No.: 406,936

[22] Filed: Sep. 13, 1989

[30] Foreign Application Priority Data

Sep. 14, 1988 [NL] Netherlands ............... 8802258

[51] Int. Cl.⁵ .............................. C08L 71/12
[52] U.S. Cl. .................... 525/132; 525/391; 525/905
[58] Field of Search ........... 525/132, 905, 391, 152

[56] References Cited

U.S. PATENT DOCUMENTS 4,656,220  4/1987  Jadamus et al. ............ 525/132
4,923,932  5/1990  Katayose et al. ........... 525/391

*Primary Examiner*—Jacob Ziegler
*Attorney, Agent, or Firm*—Joseph T. Eisele

[57] ABSTRACT

The invention relates to polymer mixtures which comprise a polyphenylene ether and a polyoctenylene. By using as a polyphenylene ether a mixture of at least two polyphenylene ethers, one having a comparatively low viscosity and one having a comparatively high viscosity, a polymer mixture is obtained having improved properties. The properties are improved in particular with respect to the flow properties, while no reduction of the heat distortion occurs.

5 Claims, No Drawings

POLYMER MIXTURE COMPRISING POLYPHENYLENE ETHERS AND POLYOCTENYLENE AND ARTICLES FORMED THEREFROM

BACKGROUND OF THE INVENTION

1. Field of the Invention

The invention relates to a polymer mixture which comprises A. a polyphenylene ether and B. a polyoctenylene. The invention also relates to articles formed therefrom.

2. Brief Description of Related Art

Polymer mixtures which comprise a polyphenylene ether and a polyoctenylene are known from DE-A-3518277. The known polymer mixtures have favourable mechanical properties, a good heat distortion and a reasonable processibility.

The invention provides polymer mixtures which have a better processibility, in particular in the melt. The polymer mixtures according to the invention have approximately the same mechanical properties and approximately equal heat distortion.

Two possibilities are available in principle to improve the processibility of polymer mixtures: the addition of additives or the use of a polymer having a lower molecular weight. In polymer mixtures which comprise a polyphenylene ether, both possibilities lead to a reduction of the heat distortion and/or the mechanical properties.

The invention is based on the discovery that the use of a mixture of at least two polyphenylene ethers having different intrinsic viscosities results in an improvement of the processibility, in particular of the flow properties of the melt, without noteworthily deteriorating the remaining properties.

SUMMARY OF THE INVENTION

The polymer mixture according to the invention is characterised in that the polymer mixture comprises as constituent A. a mixture of at least two polyphenylene ethers, the former of which (A1) comprises an intrinsic viscosity of at least 38 ml/g and the latter (A2) of which has an intrinsic viscosity of not more than 33 ml/g.

DETAILED DESCRIPTION OF THE PREFERRED EMBODIMENTS OF THE INVENTION

Intrinsic viscosity is to be understood to mean herein the value as obtained according to DIN 51562. A solution of 0.6 g of polyphenylene ether in 100 ml of chloroform is measured at 25° C. by means of an Ubbelohde Oc-type viscosimeter.

The polymer mixture according to the invention is preferably composed so that the polymer mixture comprises 0.5-50 parts by weight of constituent A2 per 100 parts by weight of A1.

The polymer mixture according to the invention usually comprises 0.5-25 parts by weight of polyoctenylene (B) per 100 parts by weight of A1+A2.

The polymer mixture according to the invention may comprise 0.1-5 parts by weight per 100 parts by weight of A1+A2+B.

The polymer mixture according to the invention may comprise 0.1-50 parts by weight of additives per 100 parts by weight of A1+A2+B.

The polymer mixture according to the invention comprises at any rate the following three constituents:
A1. a polyphenylene ether having an intrinsic viscosity of at least 38 ml/g.
A2. A polyphenylene ether having an intrinsic viscosity of not more than 33 ml/g.
B. a polyoctenylene.

A1. and A2. Polyphenylene ethers

Polyphenylene ethers are generally known polymers. Any known polyphenylene ether may be used in the polymer mixture according to the invention. An elaborate enumeration of suitable polyphenylene ethers is to be found, for example, in WO 87/00540.

Particularly suitable are poly(2,6-dimethyl-1,4-phenylene)ether, poly(2,6-diethyl-1,4-phenylene)ether, poly(2-methyl-6-ethyl-1,4-phenylene)ether. It is also possible to use copolymers, for example, copolymers which comprise units derived from 2,3,6-trimethylphenol and from 2,6-dimethylphenol.

The polymer mixture according to the invention must comprise at any rate two polyphenylene ethers having different intrinsic viscosities; one having a comparatively high viscosity and one having a comparatively low viscosity. Polyphenylene ethers having a "comparatively high viscosity" are to be understood to mean herein polyphenylene ethers having an intrinsic viscosity of at least 38 ml/g. Most commercially available polyphenylene ethers have such a viscosity. Polyphenylene ethers having a "comparatively low viscosity" are to be understood to mean herein polyphenylene ethers having a viscosity of not more than 33 ml/g. The relative quantity of the polyphenylene ethers having a comparatively low viscosity is preferably 0.5-50 parts by weight, even more preferably more than 20 parts by weight, per 100 parts by weight of polyphenylene ether having a comparatively high viscosity. When using less than 0.5 parts by weight, no essential improvement of the processibility is obtained. When using more than 50 parts by weight the mechanical properties and the heat distortion deteriorate too considerably.

Processibility is to be understood to mean in particular the processibility in the injection moulding process. For this purpose is of importance the "melt flow index" of the polymer mixture. A higher value thereof indicates a better processibility.

B. Polyoctenylene

Polyoctenylenes are known per se. For this purpose reference may be made to DE-A-3518277 and to the literature mentioned therein. Polyoctenylenes are generally prepared by a polymerisation reaction of cyclooctene, in which a ring opening and a ring expansion, respectively, may occur. All the types of polyoctenylenes mentioned in DE-A-3518277 may be used in the polymer mixture according to the invention.

It is also possible to use a mixture of different polyoctenylene compounds.

In addition to the constituents indicated hereinbefore, the polymer mixture according to the invention may comprise further constituents, for example, polyethylene and other conventionally used additives. Examples of suitable additives are agents to improve the flame-retarding properties, stabilizers, pigments, dyes, fillers, for example, reinforcing fibres, for example, glass fibres, or synthetic resin fibres.

The polymer mixture according to the invention can be obtained according to any technique for the preparation of polymer mixtures comprising a polyphenylene ether. The individual constituents are preferably compounded collectively in an extruder in the melt. The extrudate (in strand form) emanating from the extruder is then chopped to pellets. The pellets may, for example, be further processed in an injection moulding machine.

EXAMPLES I TO VI AND COMPARATIVE EXAMPLES A AND B

Various polymer mixtures were prepared using the following constituents:

PPE-1: A polyphenylene ether, namely poly(2,6-dimethyl-1,4-phenylene)ether, having an intrinsic viscosity (VI) of 41 ml/g measured as indicated hereinbefore. The polymer has a number-averaged molecular weight Mn of 12,100 and a weight-averaged molecular weight Mw of 37,000. The molecular weights are always determined by means of gel permeation chromatography using polystyrene calibration standards.

PPE-2: A poly(2,6-dimethyl-1,4-phenylene) having an IV of 16 ml/g, an Mn of 7,000 and an Mw of 15,500.

PPE-3: A poly(2,6-dimethyl-1,4-phenylene) having an IV of 26 ml/g, an Mn of 9,600 and an Mw of 24,400.

PO: A polyoctenylene, namely a product commercially available as "Vestanamer ®8012".

PE: A low-density-polyethylene having a melt index according to ISO-R-292 of approximately 20 g/10 min.

The various constituents were compounded and pelletised in the quantities as indicated in the table hereinafter. Test rods were injection-moulded from the resulting pellets to determine the "Izod notched Impact" strength, the "Izod unnotched Impact" strength (both according to ASTM D 256), the "Heat Distortion Temperature" under a stress of 1.82 MPa according to ASTM D 648, the Vicat B value according to ASTM D 1525 and the melt flow index at 300° C. and under a load of 21.6 kg according to ASTM D 1238.

The results obtained are also recorded in the table hereinafter.

It will be obvious from the table that the examples according to the invention (I to VI) all have an improved melt flow index with respect to the comparative examples A and B, but do not show any loss of heat distortion. The mechanical properties of the examples according to the invention are hardly inferior to those of the comparative examples. The composition according to example II has a particularly good melt flow index; the Izod notched impact strength, however, is slightly lower. This reduction in Izod Notched Impact can be compensated for by the addition of a small quantity of polyethylene (example VI). It may further be seen that the best values for the melt flow index are obtained by using a polyphenylene ether having an intrinsic viscosity which is as low as possible (PPE-2) in a concentration which is as high as possible.

Therefore, the polymer mixture according to the invention preferably comprises a polyphenylene ether having an intrinsic viscosity of not more than 25 ml/g as the second polyphenylene ether A2. The second polyphenylene ether is preferably used in a quantity of more than 20 parts by weight per 100 parts by weight of the first polyphenylene ether (A1).

We claim:

1. A polymer mixture, which comprises:
    A. a mixture of (1.) a first polyphenylene ether having an intrinsic viscosity of at least 38 ml/g, and (2.) a second polyphenylene ether having an intrinsic viscosity of not more than 33 ml/g; and
    B. from 0.5 to 50 parts by weight of the polyphenylene ether mixture (A.) of a polyoctenylene.

2. A polymer mixture as claimed in claim 1, wherein the polymer mixture comprises 0.5–50 parts by weight of constituent A2 per 100 parts by weight of A1.

3. A polymer mixture as claimed in claim 1, wherein the polymer mixture further comprises 0.1–5 parts by weight of polyethylene per 100 parts by weight of A1 + A2 + B.

4. Articles thermoformed from the polymer mixture as claimed in claim 1.

5. The polymer mixture of claim 1 wherein the first and second polyphenylene ethers are poly(2,6-dimethyl-1,4-phenylene ethers.

* * * * *

TABLE

| EXAMPLE | A | B | I | II | III | IV | V | VI |
|---|---|---|---|---|---|---|---|---|
| Composition (parts by weight) | | | | | | | | |
| PPE-1 | 96 | 95 | 86 | 76 | 86 | 76 | 85 | 75 |
| PPE-2 | — | — | 10 | 20 | — | — | 10 | 20 |
| PPE-3 | — | — | — | — | 10 | 20 | — | — |
| PO | 4 | 4 | 4 | 4 | 4 | 4 | 4 | 4 |
| PE | — | 1 | — | — | — | — | 1 | 1 |
| Properties | | | | | | | | |
| Izod notched impact (J/m) | 175 | 205 | 195 | 125 | 190 | 155 | 190 | 185 |
| Izod unnotched impact | | | | all : no break | | | | |
| Heat distortion temp (°C.) | 201 | 200 | 202 | 201 | 202 | 199 | 200 | 199 |
| Vicat B (°C.) | 210 | 208 | 210 | 209 | 209 | 208 | 209 | 207 |
| Melt flow index (g/10 min.) | 8.9 | 7.6 | 12.9 | 21.4 | 11.5 | 16.0 | 13.7 | 21.6 |